Patented June 28, 1932

1,864,628

UNITED STATES PATENT OFFICE

EARLE H. BARCLAY, OF HAMILTON, OHIO, ASSIGNOR TO THE SILICA GEL CORPORATION OF BALTIMORE, MARYLAND, A CORPORATION OF MARYLAND

ADSORBENT AND/OR CATALYTIC GELS AND METHOD OF MAKING SAME

No Drawing. Original application filed October 3, 1929, Serial No. 397,142. Divided and this application filed May 22, 1931. Serial No. 539,425.

The present invention relates to absorbent and/or catalytic plural gels composed of the oxides of tin, silicon and tungsten and methods of making the same.

More specifically, it is directed to a method of producing a plural gel in which the sols from which the gels are obtained are formed in one and the same solution, which after a time sets to a plural hydrogel. This hydrogel upon drying forms a hard, stable plural gel, as will hereinafter be more fully explained.

The principal object of the invention is to produce a plural gel possessing great adsorbing or catalytic power, and by a method which is commercially practicable.

According to the present invention, a solution of a stannic salt of a nature which hydrolizes strongly acid, such as stannic chloride, is added during agitation to a mixed solution of sodium silicate and sodium tungstate, the proportions and concentrations being such that the reaction mass is alkaline. This mass is allowed to set to a hydrogel or jelly and is then washed and dried as hereinafter more specifically described.

Tin salts other than the chloride such as stannic nitrate may be used as described above and they may be used in aqueous solution.

The factors which control the formation of the hydrogel are the concentration and proportions of the stannic salt solution and the silicate and tungstates solutions, the particular manner in which the solutions are mixed, the rate at which the solutions are brought together and the alkalinity of the reaction mixture. All of these factors control the properties of the dehydrated gel obtained from the hydrogel formed by the setting and drying of the reaction mixture.

A specific example for making the plural gel consisting of the oxides of tin, silicon and tungsten comprises adding 10 cc. of a sodium silicate solution of a specific gravity of 1.4 to an equal volume of a 10% solution of sodium tungstate with agitation. To the solution thus formed is then added a 10% stannic chloride solution with agitation. The quantity of stannic chloride employed is such that the reaction mass is alkaline, preferably of an alkalinity of 0.5 to 0.65 N alkali.

The reaction mass upon being allowed to stand sets to a hydrogel or jelly within about 3 minutes to 10 hours. The hydrogel is then thoroughly washed as by decantation until practically free of salts whereupon it is slowly dried at a temperature around 100° C. or a little thereabove. After being subjected to this temperature for about an hour or two, depending upon the ventilation of the drier, the temperature is raised to 150° to 200° C. for about 2 hours. The washing, previously mentioned, may be effected at any point before, during, or after the drying, or at two or more of said points, but it is preferred to thoroughly wash the hydrogel before drying.

The plural gel of the present invention is a hard, stable product and will adsorb water vapor to such an extent as to contain at least 10% of water by apparent volume, or by weight when in equilibrium with water vapor at 30° C. and a partial pressure of 22 mm. of mercury. If the concentrations and proportions of the solutions and the conditions as above described are carefully controlled, the resulting plural gel will adsorb as high as 19% by volume and 48% by weight under the above mentioned partial pressure and temperature, the apparent density of the gel being as low as 0.4.

The "per cent by apparent volume" is the product of the weight of water vapor adsorbed in a quantity of adsorbent expressed in per cent (of the dry weight), and the apparent density of the adsorbent. Thus, if a quantity of gel having an apparent density of 1.7 adsorbs 15% by weight of water, the "per cent by apparent volume" of water adsorbed is 25.5%. This is the product of 15 (percentage by weight) and 1.7 (apparent density).

The apparent density is the weight (expressed in grams) of a cubic centimeter of particles of a predetermined size. For example, if 100 grams of a gel made up of 8—14 mesh particles has a volume of 59 cc., the apparent density of the gel is 1.7, obtained by dividing the weight (100) by volume (59).

This application is a division of applicant's copending application, Serial No. 397,142, filed October 3, 1929.

Having thus described the invention, what is claimed as new and desired to be secured by Letters Patent is:

1. A method for preparing a plural gel consisting of the oxides of tin, silicon, and tungsten which comprises forming a mixture of a soluble silicate solution and a tungstate salt solution, and adding a stannic salt solution to said mixture with agitation, the proportions and concentrations of the metallic salt solutions and silicate solution being such that the reaction mass is alkaline.

2. The method of preparing a plural gel consisting of the oxides of tin, silicon, and tungsten which comprises forming a mixture of a 10% tungstate solution and a silicate solution of a specific gravity of 1.4, and adding a stannic salt solution to said mixture with agitation, the proportions and concentrations of the metallic salt solutions and silicate solution being such that the reaction mass is alkaline.

3. The method of preparing a plural gel consisting of the oxides of tin, silicon, and tungsten which comprises forming a mixture of a 10% sodium tungstate solution and a sodium silicate solution of a specific gravity of 1.4, and adding stannic chloride solution to said mixture with agitation, the proportions and concentrations of the metallic salt solutions and silicate solution being such that the reaction mass is alkaline.

4. The method of preparing a plural gel consisting of the oxides of tin, silicon, and tungsten which comprises forming a mixture of a 10% sodium tungstate solution and sodium silicate solution of a specific gravity of 1.4, and adding stannic chloride solution to said mixture with agitation, the proportions and concentrations of the metallic salt solutions and silicate solution being such that the reaction mass is alkaline, allowing the reaction mass to set to a hydrogel, washing the hydrogel, and removing most of the water from the resulting product.

5. A hard, stable, and highly porous, plural gel consisting of the oxides of tin, silicon, and tungsten.

6. A method of preparing a plural gel consisting of the oxides of tin, silicon, and tungsten comprising, adding a solution of a soluble silicate to a tungstate salt solution with agitation, adding to said mixture a stannic salt solution also with agitation, the proportions and concentrations of the metallic salt solutions and silicate solution being such that the reaction mass is alkaline.

7. A process in accordance with claim 1 wherein the reaction mass is of an alkalinity of from 0.5 to 0.65 N alkali.

8. A process in accordance with claim 3 wherein the stannic chloride employed is a 10% solution thereof.

9. A process in accordance with claim 3 including allowing said reaction to set to a hydrogel, drying said hydrogel and washing it at some stage in said process.

10. A process in accordance with claim 4 wherein the reaction mass is of an alkalinity of from 0.5 to 0.65 N alkali.

11. The method of preparing a plural gel consisting of the oxides of tin, silicon, and tungsten which comprises forming a mixture of a 10% sodium tungstate solution and a sodium silicate solution of a specific gravity of 1.4 and adding a 10% stannic chloride solution to said mixture with agitation, the proportions and concentrations of the metallic salt solutions and silicate solution being such that the reaction mass is from 0.5 to 0.65 N alkali, allowing the reaction mass to set to a hydrogel, washing the hydrogel and drying it to form a gel having not less than 3% moisture contained therein.

12. A hard, stable plural gel composed of the oxides of tin, silicon and tungsten and capable of adsorbing water vapor to such an extent as to contain at least 10% of water by apparent volume when in equilibrium with water vapor at 30° C. and a partial pressure of 22 mm. of mercury.

In testimony whereof I hereunto affix my signature.

EARLE H. BARCLAY.